United States Patent [19]

Brenner

[11] Patent Number: 4,851,157

[45] Date of Patent: Jul. 25, 1989

[54] PROCESS FOR THE PREPARATION OF VAT DYES FROM BROMINATED DIBENZANTHRONE AND 1-AMINOANTHRAQUINONE

[75] Inventor: Werner Brenner, Freiburg, Fed. Rep. of Germany

[73] Assignee: Ciba-Geigy Corporation, Hawthorne, N.Y.

[21] Appl. No.: 941,668

[22] Filed: Dec. 15, 1986

[30] Foreign Application Priority Data

Dec. 23, 1985 [CH] Switzerland ............... 5516/85

[51] Int. Cl.$^4$ ................................. C09B 3/22
[52] U.S. Cl. ................... 260/356; 260/354; 260/357
[58] Field of Search ............... 260/357, 356, 354

[56] References Cited

U.S. PATENT DOCUMENTS 1,003,268  9/1911  Just et al. ............... 260/356
4,547,575 10/1985  Tzikas ..................... 260/356
4,659,831  4/1987  Dill ........................ 260/356

OTHER PUBLICATIONS

Gilbert, Sulfonation & Related Reactions, (1965).
Houben—Weyl–vol. 2, (1953), 41–43.

*Primary Examiner*—Glennon H. Hollrah
*Assistant Examiner*—Raymond Covington
*Attorney, Agent, or Firm*—Kevin T. Mansfield; Edward McC. Roberts

[57] ABSTRACT

There is disclosed a process for the preparation of vat dyes that dye cellulosic material in a grey or black shade of good fastness properties. The process comprises brominating dibenzanthrone and reacting the brominated reaction product with 1-aminoanthraquinone in a single step.

15 Claims, No Drawings

PROCESS FOR THE PREPARATION OF VAT DYES FROM BROMINATED DIBENZANTHRONE AND 1-AMINOANTHRAQUINONE

The present invention relates to a process for the preparation of vat dyes by brominating dibenzanthrone and reacting the brominated reaction product with 1-aminoanthraquinone in one process step, and to the use of the vat dyes obtainable by said process for dyeing cellulose.

It is already known from European patent application A-88 048 that it is possible to brominate dibenzanthrone, e.g. in 80 to 100% sulfuric acid, and to react the brominated reaction product with 1-aminoanthraquinone to give a vat dye. The process disclosed in this publication is a two-step process, i.e. the dibenzanthrone brominated in the first step is isolated and purified before being further reacted.

A process has now been found that, surprisingly, makes it possible to prepare vat dyes which dye cellulosic material in a clear, grey or black shade, in a single step, without purifying the brominated dibenzanthrone obtained as intermediate.

Accordingly, the present invention relates to a process for the preparation of vat dyes which are reaction products of brominated dibenzanthrone with 1-aminoanthraquinone, which process comprises brominating dibenzanthrone, in an inert solvent, and reacting the solution of the brominated intermediate direct, i.e. without isolation of the brominated dibenzanthrone, with 1-aminoanthraquinone.

A suitable inert solvent is preferably one that has a boiling point of 150° C. or above. Examples of such solvents are halogen- or nitro-substituted aromatic solvents such as trichlorobenzene and, preferably, nitrobenzene.

It is preferred to use elemental bromine for brominating the dibenzanthrone. In this reaction, bromine is added in an amount such that, on completion of the bromination, i.e. when free bromine can no longer be detected, the brominated dibenzanthrone has a bromine content of 25 to 40%, preferably of 30 to 35%.

The amount of bromine to be used for the bromination can be reduced by adding to the reaction mixture an oxidising agent which oxidises bromide to bromine. Examples of suitable oxidisng agents are $H_2O_2$, thionyl chloride and, preferably, chlorine or sulfuryl chloride.

The bromination is preferably carried out in the presence of a bromination catalyst, e.g. an iron(III) compound such as $FeBr_3$, finely powdered iron or, preferably, iodine. The bromination catalyst is used in an amount of about 0.1 to 10 percent by weight, preferably 0.5 to 2 percent by weight, based on dibenzanthrone.

The reaction temperature of the bromination is preferably in the range from 50° to 200° C., most preferably from 100° to 160° C., and the reaction time is from 3 to 25 hours, preferably from 4 to 8 hours.

On completion of the bromination reaction, the reaction solution is freed from residual excess bromine. This can be done e.g. by distillation under reduced pressure, whereupon a mixture consisting of inert solvent and bromine is distilled off, and/or by adding a reducing agent, preferably sodium bisulfite.

The resultant solution of the brominated dibenzanthrone is subsequently reacted, without further purification, with 1-aminoanthraquinone, using e.g. 1.4 to 3.8 moles, preferably 1.4 to 3.0 moles, of 1-aminoanthraquinone per mole of brominated dibenzanthrone. The reaction is preferably conducted in the inert solvent used for the bromination, e.g. nitrobenzene, and at elevated temperature, for example in the range from 160° to 240° C., preferably from 180° to 230° C.

A preferred embodiment comprises carrying out the reaction in the presence of an acid acceptor and a condensing catalyst.

Examples of suitable acid acceptors are alkali metal hydroxides such as sodium or potassium hydroxide, alkali metal salts of low molecular organic acids or those of inorganic acids, e.g. sodium or potassium acetate or sodium or potassium carbonate, or also mixtures of said compounds. The preferred acid acceptor is sodium carbonate.

Examples of suitable condensing catalysts are e.g. copper compounds such as copper oxide or, preferably, copper(I) chloride.

After the condensation reaction, the dye is isolated in conventional manner, for example by removing the solvent by steam distillation, then collecting the dye by filtration and drying it.

A preferred embodiment of the invention comprises brominating dibenzanthrone with bromine, in an inert solvent and in the absence or presence of a bromination catalyst and/or an oxidising agent, to a bromine content of 25 to 40%, and reacting the brominated reaction product, in the presence of an acid acceptor and a condensing catalyst, with 1-aminoanthraquinone.

A particularly preferred embodiment of the process comprises brominating dibenzanthrone with bromine, in nitrobenzene and in the presence of iodine and, optionally, chlorine, to a bromine content of 30 to 35%, and reacting the brominated reaction product, in the presence of sodium carbonate and a copper compound, with 1-aminoanthraquinone.

The process of this invention affords grey or black vat dyes in an enhanced space-time yield and under particularly safe environmental conditions, as the intermediate is not isolated and, in addition, the bromination and further reaction can be carried out in the same solvent.

The vat dyes obtainable by the above described process are suitable for dyeing and printing a very wide range of materials in grey or black shades, especially for dyeing or printing fibres made of natural or regenerated cellulose in the presence of a reducing agent, e.g. dithionite. The dyes have very good build-up and the dyeings obtained therewith have good levelness and a clear shade. The fastness properties are in general very good, especially the fastness to light, water, chlorine and boiling soda.

A particular advantage of the vat dyes of this invention is that polyester fabric is not dyed at all or is dyed grey only to an insignificant degree, so that the dyes are very suitable for dyeing blends of cellulose and polyester.

In the following Examples, parts and percentages are by weight.

EXAMPLE 1

A surface ground flask is charged with 850 parts of nitrobenzene, 0.7 parts of iodine, 64.6 parts of dibenzanthrone and 150 parts of bromine, and the mixture is heated over 1 hour to 150°–153° C. and subsequently stirred for 4 hours at this temperature. After cooling the reaction mixture to 100° C., c. 180 ml of a mixture of nitrobenzene and bromine is distilled off under a water jet vacuum. Then 10 ml of a 40% solution of sodium bisulfite are added and the batch is bulked with nitrobenzene to a total volume of 1248 parts. With stirring, 61.6 parts of anhydrous sodium carbonate and 59.4 parts of 1-aminoanthraquinone are added in succession and the reaction mixture is heated for 1 hour to 165° C. After addition of 1 part of copper(I) chloride, the reaction mixture is heated to reflux temperature (204°–210° C.) and another 6 parts of copper(I) chloride are added in 6 portions over 4 hours. After the last addition of copper(I) chloride, the temperature is raised to 230° C. and the reaction mixture is stirred for 3 hours at this temperature. After cooling the reaction mixture and removing the nitrobenzene by steam distillation, the residue is isolated by filtration and washed until neutral with hot water and washed free of bromide.

For decoppering, the solid so obtained is suspended in water to give a total volume of 790 ml. Then 107 ml of 32% hydrochloric acid are slowly added and the mixture is heated to 95°–98° C. and stirred for 3 hours at this temperature. The precipitate is isolated at 60° C. and washed with hot water until neutral.

Yield: 127 parts of a dye which dyes cotton grey or black.

EXAMPLE 2

The procedure of Example 1 is repeated, except that 7 parts of copper(I) chloride are added all at once, the temperature is subsequently raised to reflux temperature (204°–210° C.), and the reaction mixture is stirred for 11 hours at this temperature. Working up and decoppering are effected as described in Example 1.

Yield: 126 parts of a dye which dyes cotton grey or black.

EXAMPLE 3

The procedure of Example 3 is repeated, except that 65.3 parts of 1-aminoanthraquinone are used.

Yield: 132 parts of a dye which dyes cotton grey or black.

EXAMPLE 4

2 parts of the dye obtained in Example 1 are vatted with 10 parts by volume of 30% aqueous sodium hydroxide solution and 5 parts of sodium bisulfite in 200 parts of water at 50°–70° C. The above stock vat is added to a dyebath containing, in 2000 parts of water, 5 parts by volume of 30% aqueous sodium hydroxide solution and 3.7 parts of sodium bisulfite. 100 parts of cotton are put into this bath at 40° C. Then 15 parts of sodium chloride are added after 10 minutes, followed by the addition of another 15 parts after 20 minutes and dyeing is carried out for 45 minutes at 40° C. The cotton is then pinched off, oxidised, and finished in conventional manner. It is dyed in a grey shade of very good fastness properties.

EXAMPLE 5

1 part of a finely dispersed dye powder containing 50% of the dye obtained in Example 1 and 1 part of a commercially available anionic dispersant are added to 200 parts of water and the pH is adjusted to 6.0–6.4 with 2 parts of monosodium phosphate. Then 10 parts of a check polyester/cotton blend (65/35) are put into this dyebath at 50° C. and the temperature of the dyebath is raised to 125° C. over 45 minutes. Dyeing is carried out for 60 minutes in a closed vessel at this temperature, then the bath is cooled to 60° C. and 2 parts by volume of 30% aqueous sodium hydroxide solution and 1 part of sodium bisulfite are added. Dyeing is continued for another 30 minutes at 60° C., then the fabric is oxidised and finished in conventional manner.

The cotton component of the blend is dyed bluish grey, the polyester resist is very good, and the polyester component is stained grey to only an insignificant degree.

What is claimed is:

1. A process for the preparation of vat dyes that are reaction pro of brominated bidenzanthrone with 1-aminoanthraquinone, which process comprises brominating dibenzanthrone, in an inert organic solvent, in the absence of sulfuric acid, and reacting the solution of the brominated intermediate with 1-aminoanthraquinone, without isolation of the brominated dibenzanthrone.

2. A process according to claim 1, wherein elemental bromine is used for the bromination.

3. A process according to claim 1, wherein the bromination is carried out in the presence of a bromination catalyst.

4. A process according to claim 3, wherein the bromination catalyst is iodine.

5. A process according to claim 1, wherein the dibenzanthrone is brominated to a bromine content of 25 to 40%.

6. A process according to claim 1, wherein nitrobenzene is used as inert solvent.

7. A process according to claim 1, wherein the bromination is carried out in the presence of an oxidising agent.

8. A process according to claim 7, wherein chlorine or sulfuryl chloride is used as oxidising agent.

9. A process according to claim 1, wherein the solution of the brominated dibenzanthrone is freed from residual excess bromine before the further reaction.

10. A process according to claim 1, wherein the reaction of the brominated dibenzanthrone with 1-aminoanthraquinone is carried out in the presence of an acid acceptor and a condensing catalyst.

11. A process according to claim 10, wherein the acid acceptor is an alkali metal hydroxide or an alkali metal salt of a low molecular organic or inorganic acid and the condensing catalyst is a copper compound.

12. A process according to claim 1, wherein the solution of the brominated dibenzanthrone is reacted with 1.4 to 3.0 moles of 1-aminoanthraquinone per mole of brominated dibenzanthrone.

13. A process according to claim 1, which comprises brominating dibenzanthrone with bromine, in an inert organic solvent and optionally in the presence of a bromination catalyst and/or an oxidising agent, to a bromine content of 25 to 40%, and reacting the brominated reaction product, in the presence of an acid acceptor and a condensing catalyst, with 1-aminoanthraquinone.

14. A process according to claim 1, which comprises brominating dibenzanthrone with bromine, in nitrobenzene and in the presence of iodine and optionally chlorine, to a bromine content of 30 to 35%, and reacting the brominated reaction product, in the presence of sodium carbonate and a copper compound, with 1-aminoanthraquinone.

15. A process according to claim 5, wherein the dibenzanthrone is brominated to a bromine content of 30 to 35%.

* * * * *